United States Patent
Nakazawa et al.

(10) Patent No.: US 6,594,069 B1
(45) Date of Patent: Jul. 15, 2003

(54) CONTROL METHOD AND CONTROL APPARATUS OF OPTICAL WAVELENGTH VARIABLE FILTER

(75) Inventors: Tadao Nakazawa, Kawasaki (JP); Hideyuki Miyata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/106,783

(22) Filed: Mar. 27, 2002

(30) Foreign Application Priority Data

Dec. 28, 2001 (JP) ........................................ 2001-399241

(51) Int. Cl.⁷ .............................. G02F 1/29; G02F 1/33
(52) U.S. Cl. ............................ 359/308; 359/305; 385/7
(58) Field of Search ................................. 359/285, 305, 359/307, 308, 559; 356/300, 51; 250/238.5, 239.1, 339.07, 343; 385/7, 11

(56) References Cited

U.S. PATENT DOCUMENTS

| 5,218,653 | A |   | 6/1993  | Johnson et al. ............... 385/11 |
| 5,652,809 | A |   | 7/1997  | Aronson ........................ 385/7 |
| 5,703,357 | A | * | 12/1997 | Shih et al. ................... 250/226 |
| 5,801,861 | A | * | 9/1998  | Majima ....................... 359/124 |
| 5,824,567 | A | * | 10/1998 | Shih et al. .................... 438/73 |
| 5,850,492 | A |   | 12/1998 | Morasca et al. ............... 385/11 |
| 5,949,562 | A | * | 9/1999  | Kubota et al. ................ 359/124 |

FOREIGN PATENT DOCUMENTS

| JP | 08-114776 | 5/1996 |
| JP | 08-211349 | 8/1996 |
| JP | 08-286160 | 11/1996 |
| JP | 09-090303 | 4/1997 |
| JP | 11-064809 | 3/1999 |

* cited by examiner

Primary Examiner—Ricky Mack
Assistant Examiner—Brandi N Thomas
(74) Attorney, Agent, or Firm—Staas & Halsey LLP

(57) ABSTRACT

The present invention aims at providing a control method and a control apparatus for controlling variable selected wavelengths at respective stages with high accuracy and reliability, to obtain desired wavelength characteristics, in a multi-staged band rejection type optical wavelength variable filter. To this end, the optical wavelength variable filter in the present invention has wavelength characteristics formed with a blocking band including a wavelength width according to a deviation amount obtained by deviating respective selected wavelengths from one another of a plurality of optical filter sections that are cascade connected, and the control apparatus for controlling the wavelength characteristics of this optical wavelength variable filter comprises a dropped light monitoring section that takes out to monitor a dropped light to be blocked from passing through at the optical filter section corresponding to the selected wavelength most closest to the center wavelength of the blocking band, among the plurality of selected wavelengths; and a selected wavelength controlling section that adjusts the respective selected wavelengths based on a peak wavelength of the dropped light.

7 Claims, 8 Drawing Sheets

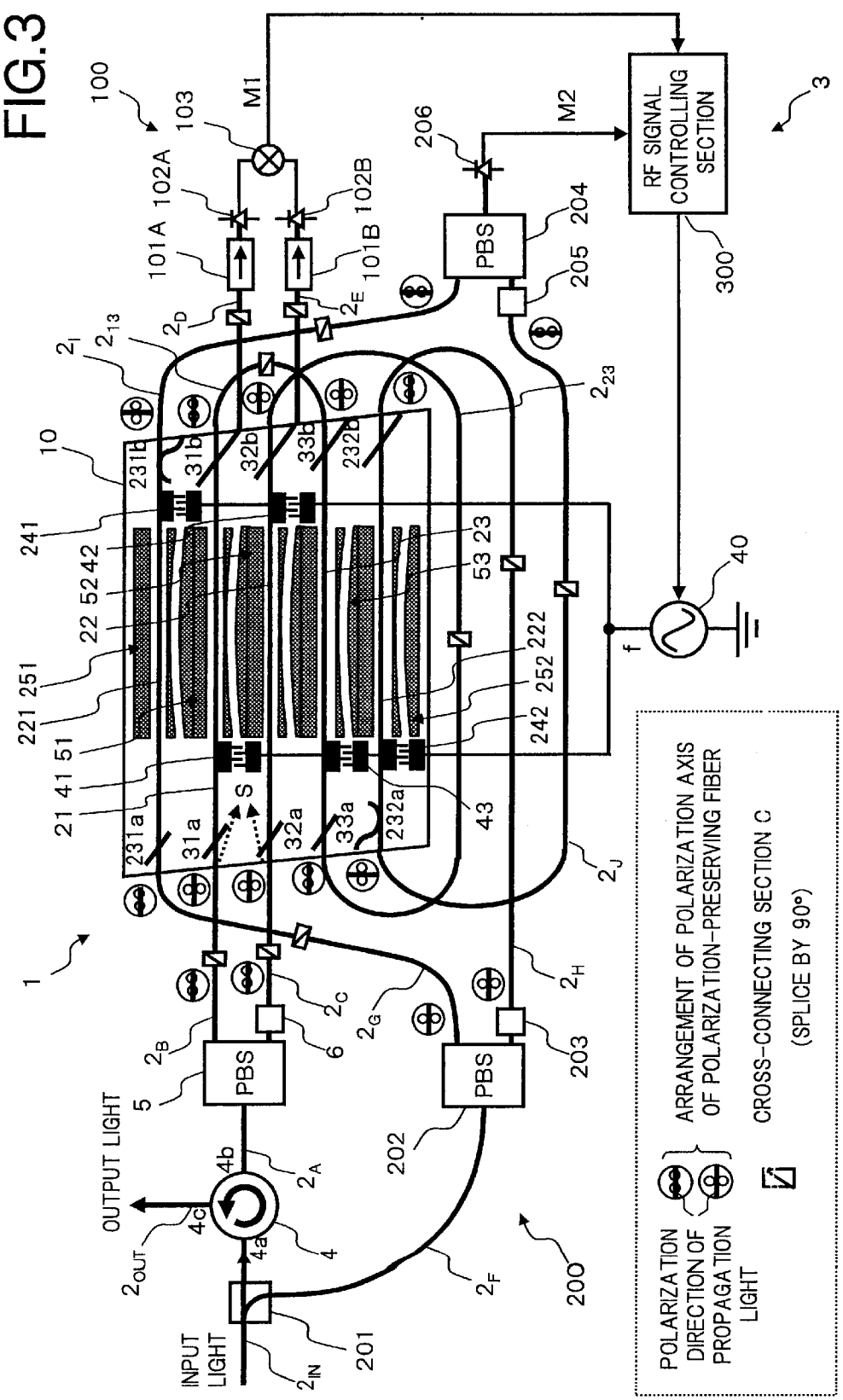

| PROPAGATION DIRECTION OF LIGHT AND SAW | WAVELENGTH Λ OF SAW SENSED BY LIGHT |
|---|---|
| STATIC (ACOUSTIC VELOCITY = 0) | $\Lambda_0$ — PROPAGATION DIRECTION OF LIGHT |
| FORWARD DIRECTION | $\Lambda_+$ — PROPAGATION DIRECTION OF SAW |
| REVERSE DIRECTION | $\Lambda_-$ — PROPAGATION DIRECTION OF SAW |

SELECTED WAVELENGTH

CONTROL METHOD AND CONTROL APPARATUS OF OPTICAL WAVELENGTH VARIABLE FILTER

BACKGROUND OF THE INVENTION (1) Field of the Invention

The present invention relates of a control technique of an optical wavelength variable filter to be utilized in various equipments for optical communication, in particular, to a control method and a control apparatus for controlling wavelength characteristics of a band rejection type optical wavelength variable filter.

(2) Related Art

There have been demanded developments of optical communication systems and optical signal processing systems capable of constructing networks of large capacities and ultra-long distance with an explosive increase of IP data communication demand. In a transmission system adopting a wavelength-division multiplexing (WDM) transmission as a basic technique thereof, it is possible to realize the large capacity transmission and easily perform the division-multiplication with the wavelength as a unit, so that the construction of flexible optical networks that performs multiplication-division of different kinds of services at optical levels, such as, optical cross-connecting (OXC), optical add/drop multiplexing (OADM) and the like. Therefore, the development and manufacturing of transmission apparatus and signal processing apparatus using the above system have been remarkably made.

In these apparatuses, there are used many optical function devices, such as, an optical wavelength filter that separates a signal light for each wavelength, and the like. Specifically, the optical wavelength filter is used, for example, for the wavelength switching in the OXC and OADM, the separation of each wavelength at a receiving section, the ASE cutting, and the like.

By forming the above mentioned optical wavelength filter on a substrate made of $SiO_2$, $LiNbO_3$ and the like, it becomes possible to achieve the high functions, downsizing, integration, reduction of electricity, and reduction of cost. Further, in a case where a plurality of optical wavelength filters are cascade connected, it is possible to achieve the narrow transmission band and the improvement of suppression ratio between other channels during used as band-pass type optical wavelength filters, and also it becomes possible to achieve the improvement of extinction ratio during used as band-rejection type optical wavelength filters (notch filters).

However, in such optical wavelength filters adopted with multi-staged structure, there is caused a problem in that the wavelength setting at respective stages needs to be controlled with high accuracy, since filter characteristics fluctuate due to a change in temperature or a change with time lapse. Further, since there is a possibility that the wavelength of light to be input to the optical wavelength filters fluctuates due to a change in environment, the function for controlling the wavelength setting as mentioned above is indispensable to the optical wavelength filters.

In particular, in the optical wavelength filter of band rejection type to be used in the OXC, OADM and the like, if the light of wavelength that should have passed through is erroneously blocked, the services to the users are suspended. An occurrence of such a situation should be avoided. In order to avoid such a situation, a wavelength controlling technique for variably controlling the wavelength (selected wavelength) of light to be blocked from passing through at each stage, with high accuracy and reliability, shall be important.

SUMMARY OF THE INVENTION

The present invention has been achieved in view of the above problems, and an object of the present invention is to provide, in an optical wavelength variable filter of band rejection type structured in multi-stages by cascade connecting a plurality of optical filter sections, a control method and a control apparatus for controlling with high accuracy and reliability selected variable wavelengths at respective stages, to obtain desired wavelength characteristics.

In order to achieve the above object, the present invention provides a control method of wavelength characteristics of an optical wavelength variable filter of band rejection type including a plurality of optical filter sections each blocking a light corresponding to a selected wavelength from passing through, the optical filter sections being cascade connected to be in a multi-staged structure, wherein, when the optical wavelength variable filter has wavelength characteristics formed with a blocking band including a wavelength band according to a deviation amount obtained by deviating respective selected wavelengths from one another of the plurality of optical filter sections, a dropped light to be blocked from passing through at the optical filter section corresponding to the selected wavelength most closest to the center wavelength of the blocking band, among the respective selected wavelengths, is taken out to be monitored, and the respective selected wavelengths are adjusted based on a peak wavelength of the monitored dropped light, to control the wavelength characteristics.

Further, according to the present invention, a control apparatus of wavelength characteristics of an optical wavelength variable filter of band rejection type including a plurality of optical filter sections each blocking a light corresponding to a selected wavelength from passing through, the optical filter sections being cascade connected to be in a multi-staged structure, wherein, when the optical wavelength variable filter has wavelength characteristics formed with a blocking band including a wavelength band according to a deviation amount obtained by deviating respective selected wavelengths from one another of the plurality of optical filter sections, said control apparatus comprises a monitoring section that takes out to monitor a dropped light to be blocked from passing through at the optical filter section corresponding to the selected wavelength most closest to the center wavelength of the blocking band, among the respective selected wavelengths, and a controlling section that adjusts the respective selected wavelengths based on a peak wavelength of the dropped light monitored by the monitoring section, to control the wavelength characteristics.

According to the control method and control apparatus of an optical wavelength variable filter as mentioned above, in the band rejection type optical wavelength variable filter of multi-staged structure, the dropped light to be blocked from passing through at the optical filter section corresponding to the selected wavelength most closest to the center wavelength of the blocking band among the selected wavelengths at respective stages is taken out to be monitored, so that the peak wavelength of the dropped light can be detected stably. Thus, it becomes possible to control the selected wavelengths at the respective optical filter sections with high accuracy and reliability. In this way, even if the setting of filters or the wavelength of input light fluctuates under an influence of a change in temperature, a change with time lapse or the like, the selected wavelengths at respective stages are adjusted following such a fluctuation, and thus it becomes possible to obtain desired wavelength characteristics stably.

Further objects, features and advantages of the present invention will become more apparent from the following description of preferred embodiments when read in conjunction with the accompanying drawings.

BRIEF EXPLANATION OF THE DRAWINGS

FIG. 2 is a conceptual diagram for explaining filter characteristics of an optical wavelength variable filter of band rejection type, in which

FIG. 3 is a block diagram showing a more specific embodiment of a control apparatus of an optical wavelength variable filter according to the present invention;

FIG. 9 is a diagram for explaining the deviation of selected wavelengths inherent to the substrate on which three-staged AOTFs are integrated, in which

DETAILED DESCRIPTION OF THE PREFERRED EMBODIMENTS

Embodiments of the present invention will be described based on the drawings.

Figure 1:
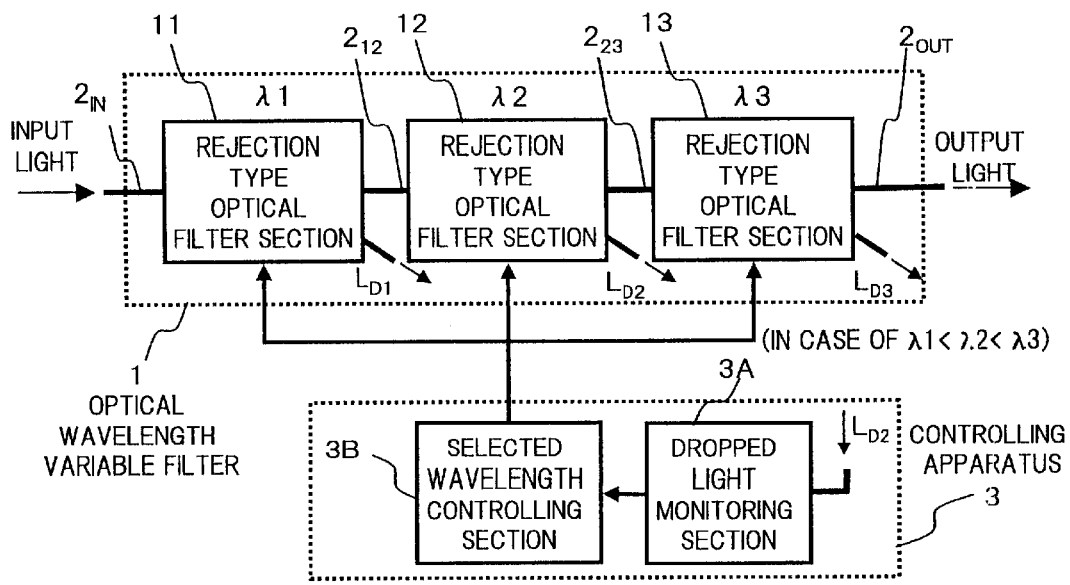
FIG. 1 is a block diagram showing an embodiment of a control apparatus of an optical wavelength variable filter according to the present invention.

FIG. 1 is a block diagram showing an embodiment of a control apparatus of an optical wavelength variable filter according to the present invention.

In FIG. 1, an optical wavelength variable filter 1 has a three-staged structure in which, for example, three optical filter sections of band rejection type 11, 12 and 13 are cascade connected via connecting optical paths $2_{12}$ and $2_{23}$.

Herein, an input optical path $2_{IN}$ that guides an input light from the outside to the optical filter section 11 at first stage, and an output optical path $2_{OUT}$ that guides an output light from the optical filter section 13 at third stage to the outside, are connected to the optical wavelength variable filter 1, respectively. Variable selected wavelengths $\lambda 1$, $\lambda 2$ and $\lambda 3$ are set to the optical filter sections 11, 12 and 13 at respective stages, respectively, and the light corresponding to each of the selected wavelengths $\lambda 1$, $\lambda 2$ and $\lambda 3$ is blocked from passing through, out of the light being propagated through each stage.

A control apparatus 3 adopted to the optical wavelength variable filter 1 includes, for example, a dropped light monitoring section 3A that takes out to monitor one of dropped lights $L_{D1}$, $L_{D2}$, and $L_{D3}$ blocked from passing through, in the optical filter sections 11, 12 and 13 at respective stages, and a selected wavelength controlling section 3B that adjusts the selected wavelengths $\lambda 1$, $\lambda 2$ and $\lambda 3$ of the optical wavelengths variable filter 1 to control wavelength characteristics, based on the monitoring result at the dropped light monitoring section 3A. The setting of dropped lights to be monitored by the dropped light monitoring section 3A will be described later.

Here, the basic setting for the selected wavelengths $\lambda 1$, $\lambda 2$ and $\lambda 3$ of the optical wavelength variable filter 1 will be described hereinafter.

Figure 2A:
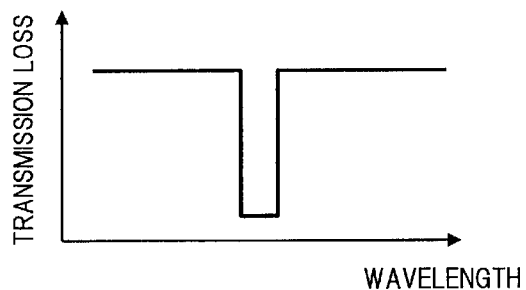
FIG. 2A shows ideal filter characteristics.

Generally, for the characteristics of the band rejection type optical wavelength filter, for example, as shown in the conceptual diagram of FIG. 2A, it is an ideal to have a filter characteristic that is changed in rectangular, namely, a change in transmissivity from the passing band to the blocking band is steep and also the blocking band has a required width. The multi-staged structure with a plurality of optical filter sections being cascade connected is useful as means for achieving the realization of such a filter characteristic. The optical wavelength filter having a filter characteristic with an excellent extinction ratio can be obtained, as the number of stages is increased.

Figure 2B:
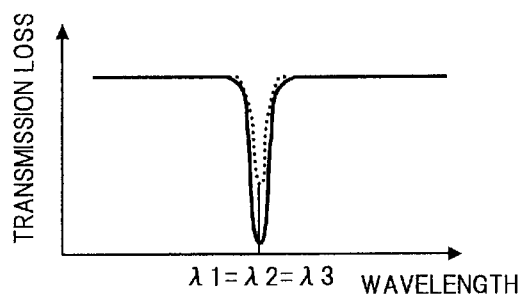
FIG. 2B shows filter characteristics of when the selected wavelengths are coincident with one another in a multi-staged structure.

When the multi-staged structure as mentioned above is applied, if the wavelengths of lights at the respective stages, that are blocked from passing through, are all coincident, as shown in the conceptual diagram of FIG. 2B, since the transmissivity becomes minimum at one point, the width of blocking band becomes narrower. For the blocking band of the rejection type optical wavelength filter, a required width needs to be ensured, considering the conditions of, for example, the wavelength width of optical signal corresponding to the spectrum width of light source such as laser, errors in setting or controlling of optical wavelength filter, or the unstable wavelength of light source. Therefore, according to the filter characteristics as shown in FIG. 2B, it becomes impossible to block the passing of optical signal of desired wavelength even in a case a slight variation is caused in the setting of the optical signal wavelength or the setting of filter.

Figure 2C:
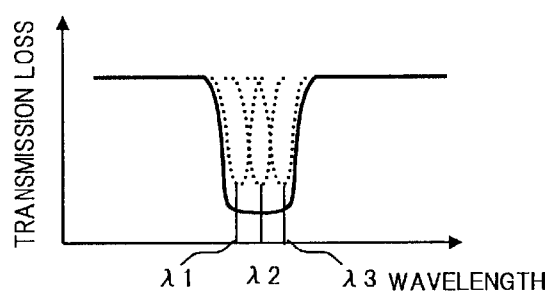
FIG. 2C shows filter characteristics of when the selected wavelengths are different from one another.

Therefore, the band rejection type optical wavelength variable filter to which the control system according to the present invention is applied, adopts the wavelength setting, as a premise, to ensure a required width of blocking band by deviating the selected wavelengths at respective stages from one another, as shown in FIG. 2C. That is, in the optical wavelength variable filter with the selected wavelengths at respective stages being deviated from one another, the transmission wavelength characteristics at respective stages shown by dotted line are overlapped to one another, so that the transmission wavelength characteristics shown by solid line can be obtained as the entire filter. In the transmission wavelength characteristics of the entire filter is formed with a blocking band having a wavelength width corresponding to a deviation amount between selected wavelengths at respective stages.

Specifically, in, the optical wavelength variable filter 1 of FIG. 1, for example, it is assumed that the selected wavelengths at respective stages are deviatedly set in advance so as to have a relationship in length of $\lambda1<\lambda2<\lambda3$, and there is formed a blocking band having a wavelength width corresponding to a deviation amount between the selected wavelength $\lambda1$ and the selected wavelength $\lambda3$.

For the optical wavelength variable filter 1 set with the selected wavelengths $\lambda1$ to $\lambda3$ at respective stages as described above, in the control apparatus 3, the selected wavelength positioned most closest to the center wavelength of the blocking band, among the selected wavelengths $\lambda1$ to $\lambda3$ at respective stages, that is, the selected wavelength $\lambda2$ in the above example, is taken notice, the dropped light $LD_2$ to be blocked from passing through by the optical filter section 12 at second stage corresponding to the selected wavelength $\lambda2$ is taken out, to be monitored by the dropped light monitoring section 3A, and the monitoring result is transmitted to the selected wavelength controlling section 3B. Then, in the selected wavelength controlling section 3B, a peak wavelength of the dropped light $L_{D2}$ is detected based on the monitoring result from the dropped light monitoring section 3A, and a wavelength deviation amount to the previously set selected wavelength $\lambda2$ is obtained, so that the selected wavelengths $\lambda1$ to $\lambda3$ at respective stages are adjusted in accordance with the wavelength deviation amount.

In this way, in the dropped light monitoring section 3A of the control apparatus 3, the dropped light $L_{D2}$ corresponding to the selected wavelength $\lambda2$ most closest to the center wavelength of the blocking band is selectively monitored. Thus, it becomes possible to judge reliably an actual filter characteristic of the optical wavelength variable filter 1. That is, each of the optical signals of respective wavelengths input to the optical wavelength variable filter 1 has the wavelength width corresponding to the spectrum width of light source, and is likely to fluctuate by an influence of unstable wavelength of the light source. Such optical signals are dropped at the optical filter sections 11 to 13 at respective stages. If the dropped light from the optical filter section of which selected wavelength is positioned at the end of the blocking band (in the above example, dropped light $L_{D1}$ or $L_{D3}$) is monitored, the wavelength of the dropped light reaches a wavelength region where the transmissivity is steeply changed, so that the level of the dropped light to be monitored by the dropped light monitoring section 3A is greatly changed. Thus, there is a possibility that the peak wavelength of the dropped light cannot be detected accurately. In order to realize the stable peak wavelength detection by avoiding such a situation, it is useful to take out to monitor the dropped light corresponding to the selected wavelength most closest to the center wavelength of the blocking band.

Even if the setting of filter or the wavelength of input light fluctuates by an influence of a change in temperature, a change with time lapse or the like, the selected wavelengths $\lambda1$ to $\lambda3$ at respective stages are adjusted following the fluctuation, by controlling with high accuracy and reliability the selected wavelengths $\lambda1$ to $\lambda3$ at respective stages of the optical wavelength variable filter 1 by the control apparatus 3. Thus, it is possible to realize stably a desired filter characteristic.

In the above embodiment, there has been shown the optical wavelength variable filter 1 of a three-staged structure by cascade connecting three optical filter sections 11 to 13. However, it is also possible to apply the control technique of the present invention to an optical wavelength variable filter of a multi-staged structure by cascade connecting four or more optical filter sections.

Next, there will be described a more specific embodiment of a control apparatus of an optical wavelength variable filter according to the present invention. In the following, the consideration is made on a control apparatus of a band rejection type optical wavelength variable filter embodied by cascade connecting three optical filter sections on the same substrate, as one example.

FIG. 3 is a plan view showing the constitution of the optical wavelength variable filter and control apparatus thereof according to the above embodiment. Components same as those in the above embodiment are denoted by the same reference numerals.

In the optical wavelength variable filter 1 shown in FIG. 3, for example, three acousto-optic tunable filters (AOTF) formed on the same substrate 10 are connected to one another by means of connecting optical paths $2_{13}$ and $2_{23}$, as optical filter sections 11 to 13. Optical input and output portions of the connected AOTFs on the same substrate 10 are connected to the input optical path $2_{IN}$ and the output optical path $2_{OUT}$ by using an optical circulator 4, a polarization beam splitter (PBS) 5, a polarization rotating section 6 and connecting optical paths $2_A$, $2_B$, $2_C$, so that the three AOTFs on the substrate 10 are cascade connected in a loop.

The control apparatus 3 to be applied to the above optical wavelength variable filter 1, for example, comprises a first monitoring section 100, a second monitoring section 200 and an RF signal controlling section 300. The first monitoring section 100 corresponding to the dropped light monitoring section 3A shown in FIG. 1, monitors a dropped light blocked from passing through by a required AOTF, so as to perform a tracking control of the selected wavelengths in the respective AOTFs cascade loop connected on the substrate 10. The second monitoring section 200, at the starting, the alteration of setting or the like of the optical wavelength variable filter 1, in order to previously detect a control value of the AOTFs cascade loop connected on the substrate 10, monitors the lights passed through monitoring AOTFs on the substrate 10, that operates in accordance with the parameter same as for the AOTFs. The RF signal controlling section 300 controls RF signals to be given to the respective AOTFs based on the monitoring results of the first and second monitoring sections 100 and 200, to control the operation states of AOTFs. The RF signal controlling section 300 has a function equivalent to the selected wavelength controlling section 3B shown in FIG. 1.

The substrate 10 is constituted such that five optical waveguides 21, 22, 23, 221 and 222 substantially parallel with one another are formed on a substrate material made of, for example, $LiNbO_3$. The optical waveguides 21 to 23 are used for the main signal, and the optical waveguides 221 and 222 are used for the second monitoring section 200. The respective optical waveguides 21, 22, 23, and 221, 222 are provided with polarization beam splitters (PBS) 31a, 31b, 32a, 32b, 33a, 33b, and 231a, 231b, 232a, 232b, respectively, at both end portions thereof. Also, the substrate 10 is formed with interdigital transducers (IDT) 41, 42, 43, and 241, 242, and SAW guides 51, 52, 53, and 251, 252, corresponding to the optical waveguides 21, 22, 23, and 221, 222, respectively.

As the respective PBSs 31a, 31b, 32a, 32b, 33a and 33b for main signal, it is possible to use, for example, PBSs of crossing waveguide type and the like. Here, input and output ports of the PBSs positioned at the crossing sides of the crossing waveguides are connected to the optical waveguides, respectively, so that the respective PBSs are constituted to be of TE mode transmission type. Further, as the respective PBSs 231a, 231b, 232a and 232b for the second monitoring section 200, it is possible to use, for example, PBSs of crossing waveguide type and the like. However, herein, input and output ports of the PBSs 231a and 232b positioned at the crossing sides of the crossing waveguides are connected to the optical waveguides, respectively, so that the PBSs 231a and 232b are constituted to be of TE mode transmission type, while input and output ports of the PBSs 231b and 232a positioned at the bar sides of the crossing waveguides are connected to the optical waveguides, respectively, so that the PBSs 231b and 232a are constituted to be of TM mode transmission type.

The respective IDTs 41 to 43, 241 and 242 are applied commonly with a signal of required frequency f generated by an RF signal generating circuit 40, to generate surface acoustic waves (SAW), respectively. Note, as will be described later, positions of the respective IDTs 41 to 43, 241 and 242 are preferably set such that relationships between the propagation directions of SAWs and the propagation directions of lights within the corresponding optical waveguides are those taking into account of influences of selected wavelength Doppler shift and the like.

The SAW guides 51 to 53, 251 and 252 are those for propagating respective SAWs generated at the IDTs 41 to 43, 241 and 242 through the optical waveguides 21 to 23, 221 and 222, respectively. Here, a case is shown where, for example, SAW guides of directional coupling type formed in required shape by Ti diffusion are used, as the SAW guides 51 to 53, 251 and 252.

In the AOTF using the SAW guides of directional coupling type, SAWs generated at the IDTs are directionally coupled by the SAW guides of required shape, so that SAWs most strongly interfere the light being propagated through the optical waveguide in the vicinity of the center of mode conversion area. Thus, it is possible to achieve the suppression of side lobe level in the filter characteristics of AOTF. Note, in the SAW guides shown in FIG. 3, curving shapes are adopted in order to directionally couple SAWs in accordance with a further desired function. In this way, it becomes possible to suppress further effectively the side lobe level.

Here, the case is shown where the AOTF using the SAW guides of directional coupling type is used. However, the present invention is not limited thereto, and it is possible to use AOTF and the like formed with SAW guides of thin film type on the optical waveguides. Further, for the AOTF using the SAW guides of thin film type, the arrangement may be such that the longitudinal direction of each SAW guide is inclined by a required amount to the axial direction of the optical waveguide so that the propagation axis of SAW and the optical axis cross each other at an inclined angle. By adopting such an arrangement, the intensity of surface acoustic wave sensed by the light is weighted in the longitudinal direction. Thus, it becomes possible to achieve the suppression of side lobe level.

The optical circulator 4 is a typical optical component that includes at least three ports 4a, 4b and 4c, and transmits the light only in a direction from the port 4a to port 4b, from the port 4b to port 4c, and from the port 4c to port 4a. This optical circulator 4 is connected with the input optical path 2IN, the connecting optical path $2_A$ to be connected to a PBS 5, and the output optical path $2_{OUT}$, at the port 4a, port 4b, and port 4c, respectively.

The PBS 5 splits an input light sent from the port 4b of the optical circulator 4 via the connecting optical path $2_A$ into two polarization lights with polarization planes thereof being orthogonal to each other, to output one of the two polarization lights to one end of the connecting optical path $2_B$, while outputting the other polarization light to one end of the connecting optical path $2_C$. The other end of the connecting optical path $2_B$ is connected to the PBS 31a positioned on the optical waveguide 21 of the substrate 10, and the other end of the connecting optical path $2_C$ is connected to the PBS 32a positioned on the optical waveguide 22 of the substrate 10. Also, herein, a polarization rotating section 6 is inserted onto the connecting optical path $2_C$. The polarization rotating section 6 has a function for rotating the polarization plane of the other polarization light split by the PBS 5 by 90 degrees.

The PBS 31b positioned on the optical waveguide 21 of the substrate 10 is connected to the PBS 33b positioned on the optical waveguide 23 by the connecting optical path $2_{13}$. Further, the PBS 32b positioned on the optical waveguide 22 of the substrate 10 is connected to the PBS 33a positioned on the end portion of the optical waveguide 23 by the connecting optical path $2_{23}$. Thus, the three AOTFs for main signal on the substrate 10 are cascade connected in a loop between the input optical path $2_{IN}$ and the output optical path $2_{OUT}$.

Figure 4:
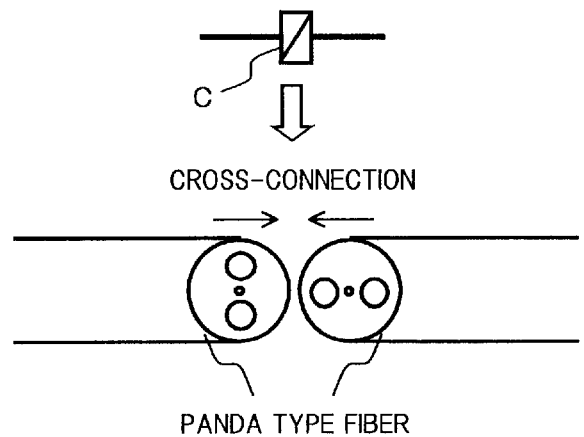
FIG. 4 is a diagram for explaining the cross-connection of connecting optical paths in the optical wavelength variable filter of FIG. 3.

The connecting optical paths $2_B$, $2_C$, $2_{13}$ and $2_{23}$ are polarization-preserving fibers, and here, for example, PANDA type fibers are used. However, the structure of polarization-preserving fiber is not limited to the PANDA type fiber, and it is possible to adopt a known structured fiber. Further, each of the connecting optical paths $2_B$, $2_C$, $2_{13}$ and $2_{23}$ includes a cross-connecting section C spliced by rotating the polarization axis substantially by 90 degrees as shown in FIG. 4, and suppresses an influence due to the deviation of polarization axis of when connecting an optical device having polarization dependence by the polarization-preserving fiber, as described later.

Moreover, the first monitoring section 100 connected to the substrate 10 comprises an optical isolator 101A and a light receiver 102A for monitoring a dropped light from the lights sequentially passing in one direction through the respective AOTFs cascade loop connected to one another, an optical isolator 101B and a light receiver 102B for monitoring a dropped light from the lights sequentially passing in the other direction through the respective AOTFs cascade loop connected to one another, and a circuit 103 that adds up output signals photo-electrically converted by the light receivers 102A and 102B, to output a monitor signal M1.

Here, an input port of the optical isolator 101A is connected to a TM mode output port of the PBS 31b on the substrate 10 via a connecting optical path $2_D$, while an input port of the optical isolator 101B is connected to a TM mode output port of the PBS 32b on the substrate 10 via a connecting optical path $2_E$. Note, it is assumed that a position for monitoring the dropped signal for the light in each direction is set to an AOTF stage wherein the selected wavelength is positioned most closest to the center wavelength of blocking band, as in the case of the dropped light monitoring section 3A in the above embodiment.

Further, the second monitoring section 200 connected to the substrate 10 includes an optical coupler 201 on the input optical path $2_{IN}$ that branches a part of the input light by a required branching ratio (for example, 10:1 and the like), a PBS 202 that polarization splits the branched light from the optical coupler 201 to send the split lights to the respective monitoring AOTFs on the substrate 10, a PBS 204 that multiplexes the polarization lights passed through the monitoring AOTFs on the substrate 10, and a light receiver 206 that converts the monitor light multiplexed by the PBS 204 into an electrical signal, to thereby output a monitor signal M2.

The PBS 202 splits the branched light sent from the optical coupler 201 via a connecting optical path $2_F$ into two polarization lights with polarization planes thereof being orthogonal to each other, and outputs one of the polarization lights to one end of a connecting optical path $2_G$, while outputting the other polarization light to one end of a connecting optical path $2_H$. The other end of the connecting optical path $2_G$ is connected to a PBS 231a positioned on the optical waveguide 221 of the substrate 10, and the other end of the connecting optical path $2_H$ is connected to a PBS 232b positioned on the optical waveguide 222 of the substrate 10. Also, herein, a polarization rotating section 203 is inserted onto the connecting optical path $2_H$. The polarization rotating section 203 has a function for rotating the polarization plane of the other polarization light split by the PBS 202 by 90 degrees.

The PBS 204 multiplexes the polarization lights with polarization planes thereof being orthogonal to each other, passed through the monitoring AOTFs on the substrate 10 to be sent via respective connecting optical paths $2_I$ and $2_J$, to output the multiplexed light to the light receiver 206. Specifically, a TM mode light output from a PBS 231b on the optical waveguide 221 of the substrate 10 is input to the PBS 204 through the connecting optical path $2_I$, and at the same time, a TM mode light output from a PBS 232a on the optical waveguide 222 of the substrate 10 passes through the connecting optical path $2_J$ and is rotated with polarization plane thereof by 90 degrees at a polarization rotating section 205, to be input to the PBS 204.

For the respective connecting optical paths $2_D$, $2_E$, $2_G$, $2_H$, $2_I$ and $2_J$ used in the first and second monitoring sections 100 and 200, for example, optical paths of polarization-preserving type such as PANDA type fiber are used, and each optical path includes, in the vicinity of the center in the longitudinal direction, the cross-connecting section C of the same structure as in the above mentioned FIG. 4.

Figure 5:
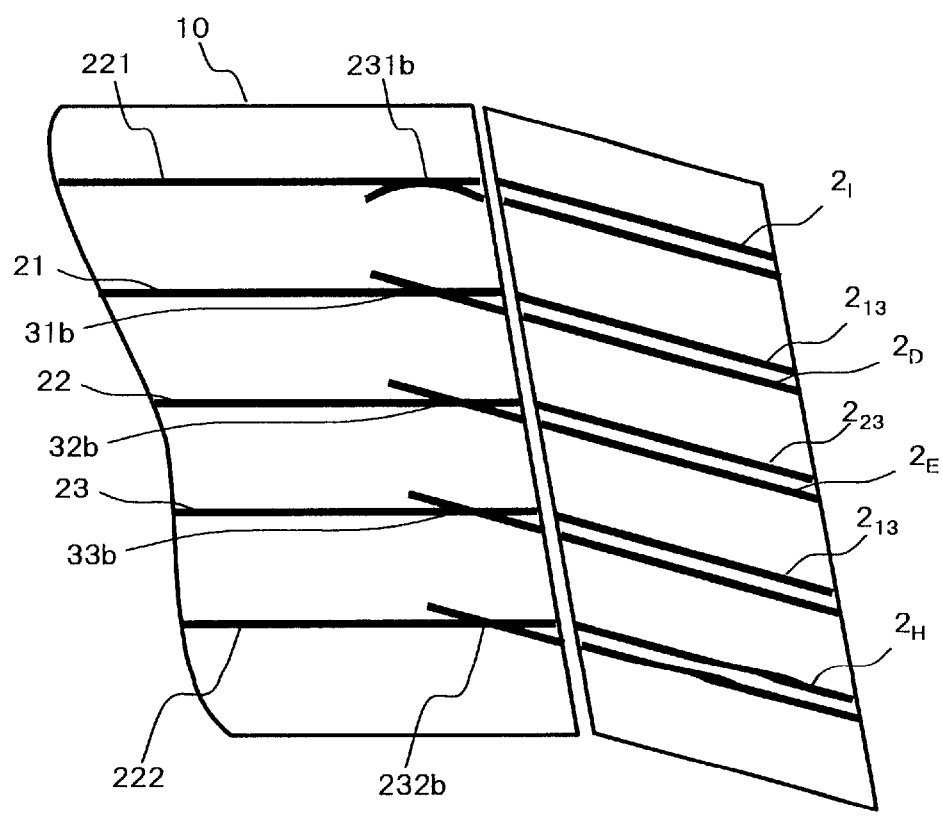
FIG. 5 is a diagram showing one example of the end face shape of a substrate in the optical wavelength variable filter of FIG. 3.
Figure 6:
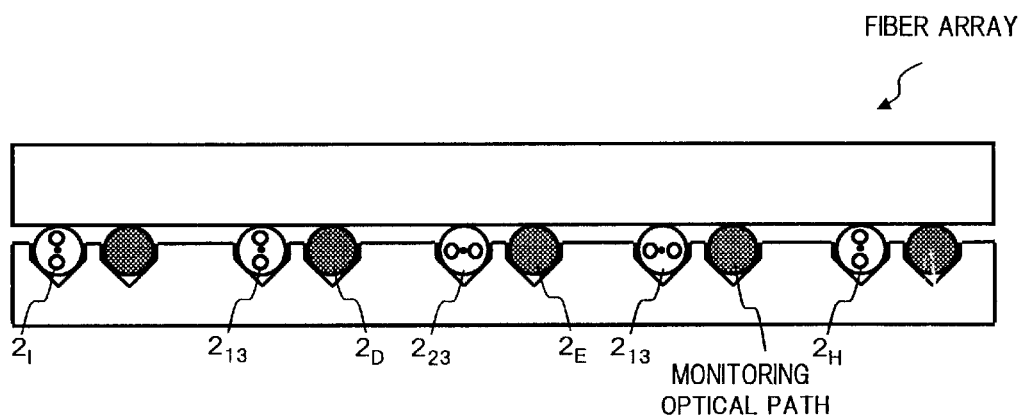
FIG. 6 is a diagram showing one example of fiber array structure connected to the substrate end face in the optical wavelength variable filter of FIG. 3.

It is preferable that two end faces opposite to each other of the substrate 10, to which the respective optical paths for main signal and for monitoring are connected, are inclined by required angles so as to reduce an influence of reflected light at the faces connected with the respective optical paths, for example, as shown in FIG. 5. Also, it is preferable that the optical fibers to be connected to each of the substrate end faces are structured in a fiber array, for example, as shown in FIG. 6. Note, the optical fibers provided in parallel to the respective connecting optical paths $2_{13}$ and $2_{23}$ in FIG. 6, are for extracting the dropped lights and the like to be blocked from passing through by the AOTFs at respective stages. An arrangement for the polarization axes of the polarization-preserving fibers within the fiber array is desirable to be set, considering the symmetry with a fiber array connected to the substrate end face on the opposite side, so that the kinds of the both side fiber arrays are the same.

In the optical wavelength variable filter 1 having the above mentioned constitution, the input light propagated through the input optical path $2_{IN}$ is sent to the PBS 5 via the optical circulator 4 and the connecting optical path $2_A$, and split into two polarization lights orthogonal to each other, to be output to the connecting optical paths $2_B$ and $2_C$, respectively. The polarization light output to the connecting optical path $2_C$ is rotated with polarization plane thereof by 90 degrees by the polarization rotating section 6, to be aligned with the polarization direction of the polarization light output to the connecting optical path $2_B$. Then, the respective polarization lights propagated through the connecting optical paths $2_B$ and $2_C$ are given to the PBSs 31a and 32a on the substrate 10, respectively, as the TE mode lights. Note, in FIG. 3, the polarization directions of propagated lights are indicated together with the cross section of arrangement of polarization axes of the PANDA type fibers, so that the polarization directions of propagated lights at the respective portions on the optical paths cascade loop connected can be clearly understood.

The TE mode light given to the PBS 31a passes therethrough and is propagated through the optical waveguide 21 toward the PBS 31b. At this time, SAW generated as a result that the RF signal of frequency f from the RF signal generating circuit 40 is applied to the IDT 41, is guided along the optical waveguide 21 by the SAW guide 51, to be propagated in the same direction (forward direction) as the propagated light within the optical waveguide 21. Due to the acousto-optic effect by this SAW, only the light of wavelength corresponding to the frequency of SAW (selected wavelength) out of the TE mode light being propagated within the optical waveguide 21, is mode converted into a TM mode light. Then, the lights of respective modes reach the PBS 31b, the TE mode light of wavelengths different from the selected wavelength (non-selected wavelengths), that has not been mode converted, passes through the PBS 31b to be output to the connecting optical path $2_{13}$, while the mode converted TM mode light of selected wavelength is branched by the PBS 31b as a dropped light, to be sent to the optical isolator 101A of the first monitoring section 100.

The TE mode light output to the connecting optical path $2_{13}$ passes through the PANDA type fiber that is spliced by 90 degrees in the vicinity of the center in the longitudinal direction, to be sent to the PBS 33b on the optical waveguide 23. At this time, a periodic wavelength dependence loss or polarization mode dispersion (PMD) due to inter-polarization-mode interference caused in the PANDA type fiber, and a polarization dependence loss (PDL) caused in the PBS on the substrate 10 and the like are offset in front of and behind the 90 degree splice point, to be suppressed.

Here, there will be described the inter-polarization-mode interference caused within the optical paths of polarization-preserving type.

In a case where a plurality of optical devices each having polarization dependence are connected by polarization-preserving fiber or the like, it is an ideal to perform the connection by completely coinciding the polarization axis (Fast axis, Slow axis) directions of the polarization-preserving fiber with the axis direction of polarization light to be input/output to/from the optical devices. However, in the actual connection of the polarization-preserving fiber with the optical devices, it is difficult to completely coincide the axis directions with each other and thus, certain axis deviation cannot be avoided.

Figure 7:
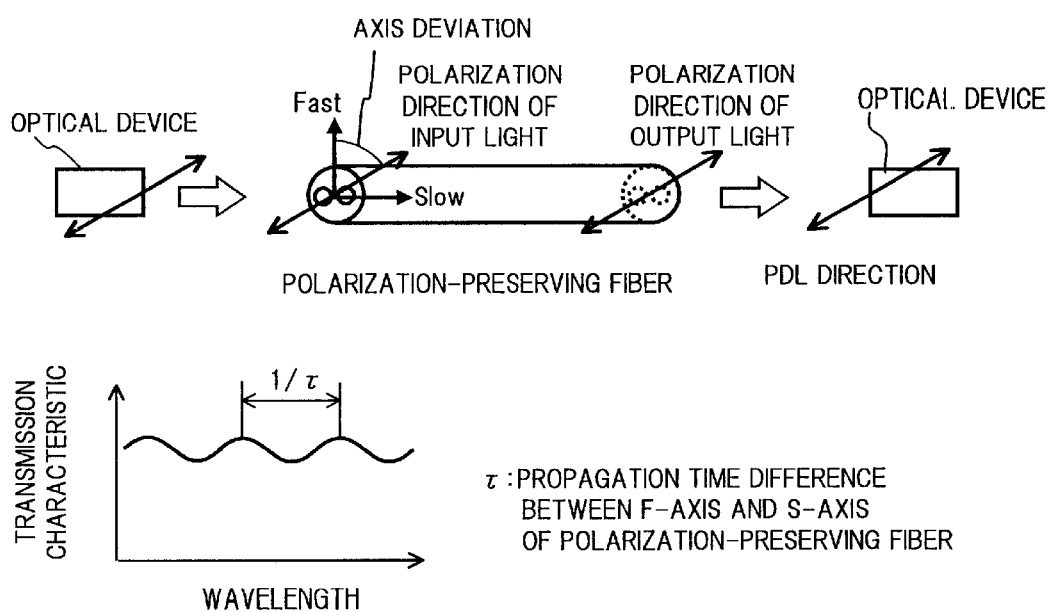
FIG. 7 is a diagram for explaining inter-polarization-mode interference of a polarization-preserving fiber.

If the axis deviation as mentioned above is caused, as shown in FIG. 7, the inter-polarization-mode interference of the polarization-preserving fiber is caused, resulted in the periodic wavelength dependence loss in the transmission characteristics of optical devices. The period of this periodic wavelength dependence loss becomes 1/τ, if a difference between the propagation times of Fast axis and Slow axis of the polarization-preserving fiber is τ. Such a periodic wavelength dependence loss due to the inter-polarization-mode interference of the polarization-preserving fiber causes a change in level of transmission light in an optical filter of band rejection type according to the wavelength, to lead characteristic deterioration.

Therefore, in the present optical wavelength variable filter 1, by splicing the PANDA type fiber by rotating the polarization axis thereof by 90 degrees in the vicinity of the center of the connecting optical path in the longitudinal direction, the respective directions of Fast axis and Slow axis are switched in front of and behind the splicing point, so that the polarization light to be propagated through the connecting optical path is propagated through the respective polarization axes for substantially equal distances. Thus, the influence by the above mentioned periodic wavelength dependence loss, PMD or PDL shall be offset.

The TE mode light sent to the PBS 33b on the substrate 10 passes therethrough and is propagated within the optical waveguide 23 toward the PBS 33a. At this time, SAW generated at the IDT 43 and guided by the SAW guide 53 is propagated in a reverse direction to the propagated light within the optical waveguide 23. Due to the acoust-optic effect by this SAW, only the light corresponding to the selected wavelength out of the TE mode light being propagated through the optical waveguide 23 is mode converted into a TM mode light. Then, when the lights of respective modes reach the PBS 33a, the TE mode light of non-selected wavelengths, that has not been mode converted, passes through the PBS 33a to be output to the connecting optical path 2₂₃, while the mode converted TM mode light of selected wavelength is branched by the PBS 33a.

The TE mode light output to the connecting optical path 2₂₃ is sent to the PBS 32b on the optical waveguide 22 while the periodic wavelength dependence loss and the like thereof being suppressed by passing the PANDA type fiber having the cross-connecting section C, in the same manner as when passed through the connecting optical path 2₁₃.

The TE mode light sent to the PBS 32b passes therethrough and is propagated within the optical waveguide 22 toward the PBS 32a. At this time, SAW generated at the IDT 42 and guided by the SAW guide 52 is propagated in a forward direction to the propagated light within the optical waveguide 22. Due to the acoust-optic effect by this SAW, only the light corresponding to the selected wavelength out of the TE mode light being propagated through the optical waveguide 22 is mode converted into a TM mode light. The TE mode light of non-selected wavelengths, that has not been mode converted, passes through the PBS 32a to be output to the connecting optical path 2_C, while the mode converted TM mode light of selected wavelength is branched by the PBS 32a. The TE mode light output to the connecting optical path 2_C is rotated with the polarization plane thereof by 90 degrees by the polarization rotating section 6 on the connecting optical path 2_C and then returned to the PBS 5.

The respective selected wavelengths to be mode converted at the respective optical waveguides 21 to 23 are slightly different from one another, due to the selected wavelength Doppler shift to be described in the following, or inherent wavelength deviation caused by variations in manufacturing process of the substrate 10, even in a constitution where the RF signal is applied commonly to the IDTs 41 to 43.

Here, the selected wavelength Doppler shift will be described.

Figure 8:
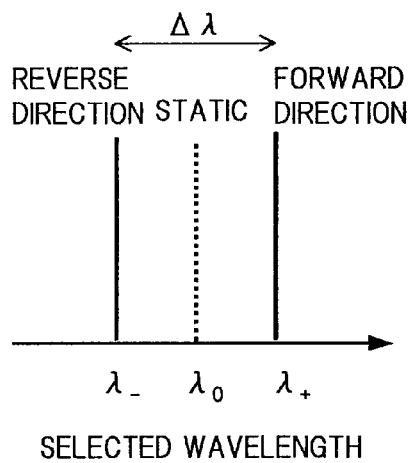
FIG. 8 is a diagram for explaining the selected wavelength Doppler shift in AOTF.

The selected wavelength Doppler shift is a phenomenon in which the wavelengths of the light to be polarization mode converted become different from one another due to the acousto-optic effect, depending on a relationship between the propagation direction of light within the optical waveguide and that of SAW transmitted along that optical waveguide. This phenomenon is caused by the same theory as that of typically known Doppler shift, and in the above case, it can be considered that the wavelength (frequency) of SAW viewed from the light is changed. Accordingly, for example, as shown in FIG. 8, if the propagation direction of light is the same forward direction as the propagation direction of SAW, the wavelength of SAW sensed by the light becomes longer. On the contrary, if the propagation direction of light is the reverse direction to the propagation direction of SAW, the wavelength of SAW sensed by the light becomes shorter. The selected wavelength λ in a case of influenced by such a Doppler shift, can be represented by the following equation (1);

$$\lambda = \frac{\lambda_0}{1 - v/c} \quad (1)$$

wherein $\lambda_0$ is the selected wavelength in a case where SAW is static, v is a speed of SAW, and c is an average speed of light in the optical waveguide.

Accordingly, a selected wavelength difference Δλ caused by whether the propagation directions of the light and SAW are forward directions or reverse directions can be represented by the following equation (2).

$$\Delta\lambda = 2 \cdot \lambda_0 \cdot \frac{v/c}{1 - (v/c)^2} \quad (2)$$

In the optical wavelength variable filter 1 of rejection type with three AOTFs cascade loop connected as shown in FIG. 3, the selected wavelengths in the AOTFs at respective stages are different from one another due to the inherent wavelength deviation caused by variations in manufacturing process of the substrate 10 in addition to the selected wavelength difference Δλ due to the above mentioned selected wavelength Doppler shift. The wavelength deviation caused by variations in manufacturing process, for example, is inherently caused in individual substrates due to manufacturing errors in width of the optical waveguides 21 to 23 at respective stages.

Since the wavelength characteristics of the optical wavelength variable filter 1 is regarded, as a premise, to ensure a required width of the blocking band by slightly deviating the selected wavelengths of AOTFs at respective stages from one another, as shown in FIG. 2C, herein the wavelength deviation inherent to the substrate caused by variations in manufacturing process is considered and also the selected wavelength difference Δλ due to the selected wavelength Doppler shift is utilized, to realize the setting of selected wavelengths deviated from one another as described above.

Figures 9A, 9B, 9C:
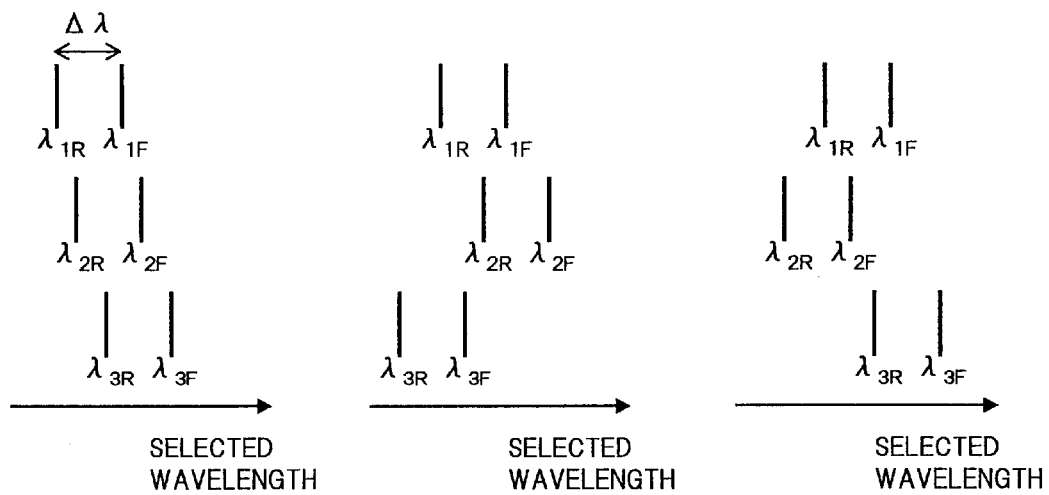
FIG. 9A to FIG. 9C are exemplary diagrams of wavelength deviation patterns.
Figure 9D:
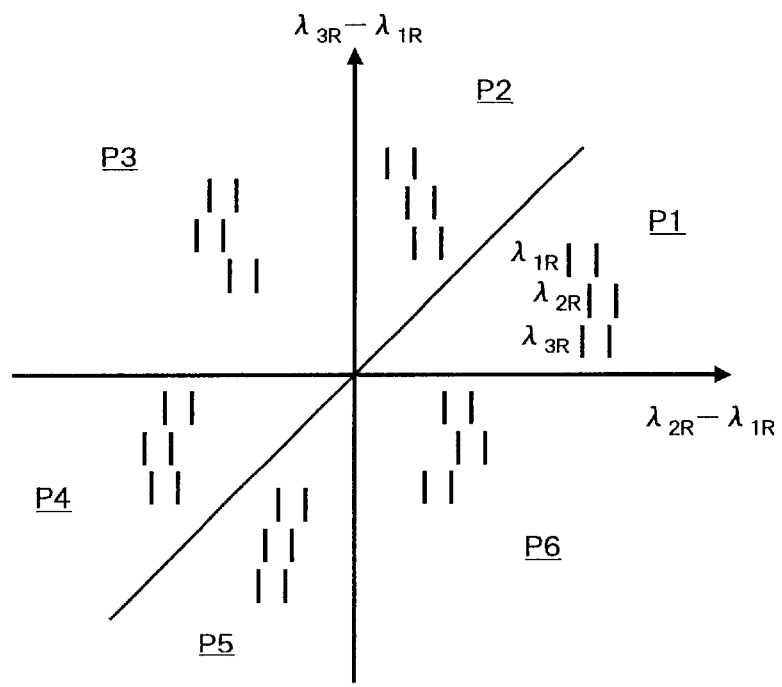
FIG. 9D is a diagram showing a typical wavelength deviation pattern.

Specifically, when the selected wavelengths corresponding to the respective optical waveguides 21, 22, 23 when SAWs of the same frequency f are given in the forward directions to the propagated lights are made $\lambda_{1F}$, $\lambda_{2F}$ and $\lambda_{3F}$, while the selected wavelengths corresponding to the respective optical waveguides 21, 22, 23 when SAWs of the same frequency f are given in the reverse directions to the propagated lights are made $\lambda_{1R}$, $\lambda_{2R}$ and $\lambda_{3R}$, there occurs various patterns in the wavelength deviation inherent to the substrate caused by variations in manufacturing process, as shown in FIG. 9A to FIG. 9C, for example. Such wavelength deviation patterns of the three staged AOTFs can be classified into six patterns P1 to P6 as shown in FIG. 9D when the values of $\lambda_{2R}-\lambda_{1R}$ are put on the horizontal axis and the values of $\lambda_{3R}-\lambda_{1R}$ are put on the transverse axis with the selected wavelength $\lambda_{1R}$ as the reference.

In order to realize the selected wavelengths that are slightly deviated among the respective stages as shown in FIG. 2C, it is required to determine optimum combinations of the wavelength deviation of the patterns P1 to P6, with the wavelength difference due to the selected wavelength Doppler shift. When determining the optimum combinations, it is desired to consider the condition that the connection relationship in which such kinds of fiber arrays as explained in FIG. 6 can be made same on the both ends of the substrate 10, and the connection relationship of the input and output for suppressing an influence by stray light as described in the following, are satisfied at the same time.

In a case where a plurality of optical devices integrated on the same substrate are connected to be used, most of the input light from a substrate input section passes through the optical devices, however, as shown by an arrow in dotted line in FIG. 3, a part of the input light is emitted into the substrate to be propagated as the stray light S. This stray light S is likely to be coupled to an output section bypassing the optical devices, thereby causing deterioration of extinction ratio and the like.

In order to effectively suppress such a leakage phenomenon of the stray light S from the input side to the output side, for example, in a case where a plurality of optical devices on the same substrate are cascade connected to be used, such a connection relationship is preferable that both ends of optical path passing through all of optical devices are positioned on the same end face of the substrate. By realizing such a connection relationship, the stray light S from the input side is hardly to be coupled to the light being propagated within the optical path on the output side.

Figure 10:
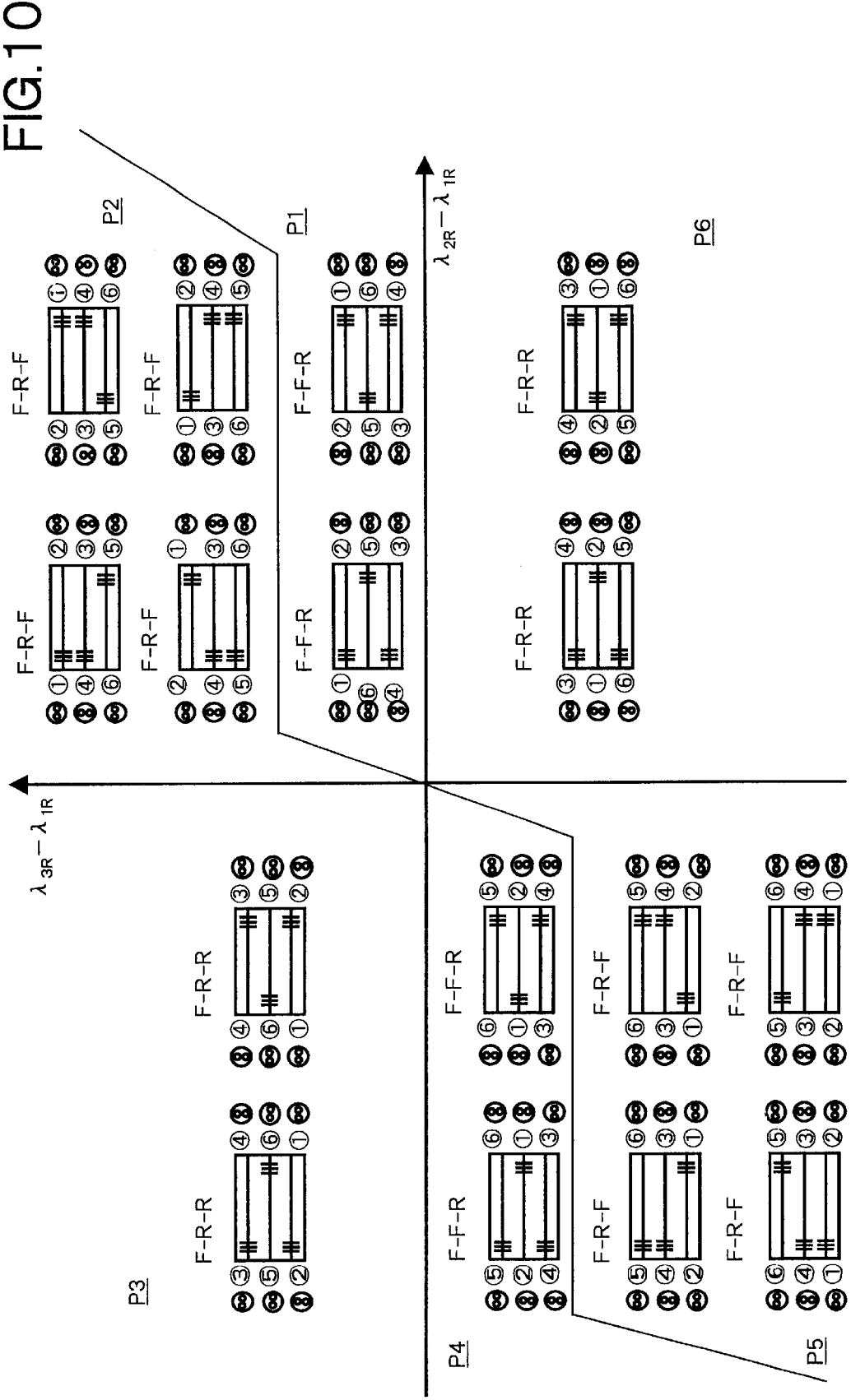
FIG. 10 is a schematic view arranging optimum connection relationships in view of an influence of selected wavelength Doppler shift and the like, according to the wavelength deviation patterns in FIG. 9.

The optimum combinations satisfying all the conditions of the above mentioned selected wavelength Doppler shift and the like, including the connection relationship of input and output for suppressing the above influence by the stray light, can be determined corresponding to the respective patterns P1 to P6 in FIG. 9D, and the combination results are shown in FIG. 10.

In FIG. 10, the numerals ① to ⑥ indicated at both ends of the substrate show the connecting orders of AOTFs at respective stages. Further, characters such as "F-F-R" (forward-forward-reverse) indicated at the upper part of the substrate show the propagation direction of SAW relative to the light being propagated through the optical waveguide positioned at the upper stage of the substrate in the figure, the propagation direction of SAW relative to the light being propagated through the optical waveguide positioned at the middle stage of the substrate, and the propagation direction of SAW relative to the light being propagated through the optical waveguide positioned at the lower stage of the substrate, in this sequence. Further, arrangements of respective polarization axes of when the respective PANDA type fibers connected to the both ends of the substrate are made fiber arrays of same kind, are shown on the right and left sides of the substrate.

The constitution of the optical wavelength variable filter shown in FIG. 3 specifically illustrates the connection relationship corresponding to the pattern P1 in FIG. 10. For the selected wavelength Doppler shift, the arrangement of the IDTs 41, 43 and 42 at the respective stages are set so that, to the light given via the connecting optical path $2_B$, the propagation direction of SAW in the AOTF of the first stage corresponding to the optical waveguide 21 is the forward direction, the propagation direction of SAW in the AOTF of the second stage corresponding to the optical waveguide 23 is the reverse direction, and the propagation direction of SAW in the AOTF of the third stage corresponding to the optical waveguide 22 is the forward direction. In the AOTFs at respective stages, since the RF signal of the same frequency is given to the IDTs, the wavelength difference due to the selected wavelength Doppler shift corresponding to the above equation (2) is caused between the selected wavelengths at the first and third stages, and the selected wavelength at the second stage. Thus, by combining the wavelength difference with the inherent wavelength deviation of the pattern P1, it becomes possible to realize the filter characteristic as shown in FIG. 2C.

In the optical wavelength variable filter 1, the TE mode light given from the PBS 5 to the PBS 32a of the substrate 10 via the connecting optical path $2_C$ and the polarization rotating section 6 passes through the AOTFs at respective stages sequentially, in reverse to the TE mode light given to the PBS 31a of the substrate 10 via the connecting optical path $2_B$, namely, passes sequentially through the optical waveguide 22, PBS 32a, connecting optical path $2_{23}$, PBS 33a, optical waveguide 23, PBS 33b, connecting optical path $2_{13}$, PBS 31b, optical waveguide 21 and PBS 31a, to be output to the connecting optical path $2_B$, and is returned to the PBS 5 under the polarization state just as is without polarization plane thereof rotated. In this reverse propagation of the polarization light, the mode converted TM mode light corresponding to the selected wavelength when being propagated through the optical waveguide 22, is branched by the PBS 32b as the dropped light, to be sent to the optical isolator 101B of the first monitoring section 100.

The respective polarization lights with polarization planes thereof being orthogonal to each other, returned to the PBS 5 via the connecting optical paths $2_B$ and $2_C$, are multiplexed by the PBS 5 and thereafter sent to the optical circulator 4 via the connecting optical path $2_A$, to be output to the output optical path $2_{OUT}$ after passing from the port 4b to the port 4c.

As mentioned above, when the polarization lights from the connecting optical paths $2_B$ and $2_C$ are propagated in bi-directions through the three staged AOTFs cascade loop connected on the substrate 10, the stray light S generated from each of the PBSs 31a and 32a at the one end of each of the optical waveguides 21 and 22 is propagated toward the end face on the opposite side to the optical input side of the substrate 10. However, since the connecting optical paths $2_B$ and $2_C$ are connected to the PBSs 31a and 32a positioned on the same end face of the substrate 10, respectively, the leakage phenomenon of the stray light from the input side to the output side is suppressed.

Moreover, in the optical wavelength variable filter 1, the dropped lights branched by the PBSs 31b and 32b, pass through the optical isolators 101A and 101B of the first monitoring section 100, to be converted into electrical signals at the light receivers 102A and 102B, respectively, and further are added up by the circuit 103 to be sent to the RF signal controlling section 300 as the monitor signal M1. In the RF signal controlling section 300, the peak wavelengths of the dropped lights are detected based on the monitor signal M1, and an amount of wavelength deviation to the previously set control value (selected wavelength) is obtained based on the monitoring result by the second monitoring section 200.

In the RF signal controlling section 300, as a method for detecting the peak wavelengths of the dropped lights based on the monitor signal M1, for example, a method to add dithering to the frequency f of RF signal to be applied commonly to the IDTs 41 to 43 at the respective stages, is suitable. Specifically, in a case where the frequency f of RF signal is set to, for example, 170 MHz, 4 kHz or the like is set as the frequency Δf of the dithering, and the RF signal of which frequency fluctuates within a range of f±Δf is applied to each of the IDTs 41 to 43. Thus, the selected wavelengths to be mode converted in the AOTFs at the respective stages fluctuate corresponding to the frequency Δf of the dithering. Accordingly, the monitor signal M1 to be monitored by the first monitoring section 100 includes frequency components corresponding to the dithering. Thus, it becomes possible to detect the peak wavelengths of the actually dropped lights by utilizing the detected frequency components.

Also, in a case where the dithering is added to the frequency of RF signal as described above, the dropped light is taken out from the AOTF stage corresponding to the selected wavelength most closest to the center wavelength of the blocking band, to monitor the dropped light by the first monitoring section 100, it is possible to detect reliably the peak wavelength of the dropped light. That is, if the dropped light from the AOTF stage of which selected wavelength is positioned at the end portion of the blocking band is monitored, the wavelength of the dropped light fluctuating by the dithering reaches the wavelength region where the transmissivity is steeply changed, so that the level of dropped light to be monitored by the first monitoring section 100 is largely changed, thereby resulting in a possibility that the peak wavelength of dropped light cannot be accurately detected. However, such a situation can be avoided by taking out the dropped light from the AOTF stage of which selected wavelength is positioned at the center of blocking band, to monitor the dropped light, thereby enabling to realize the stable peak wavelength detection.

Figure 11:
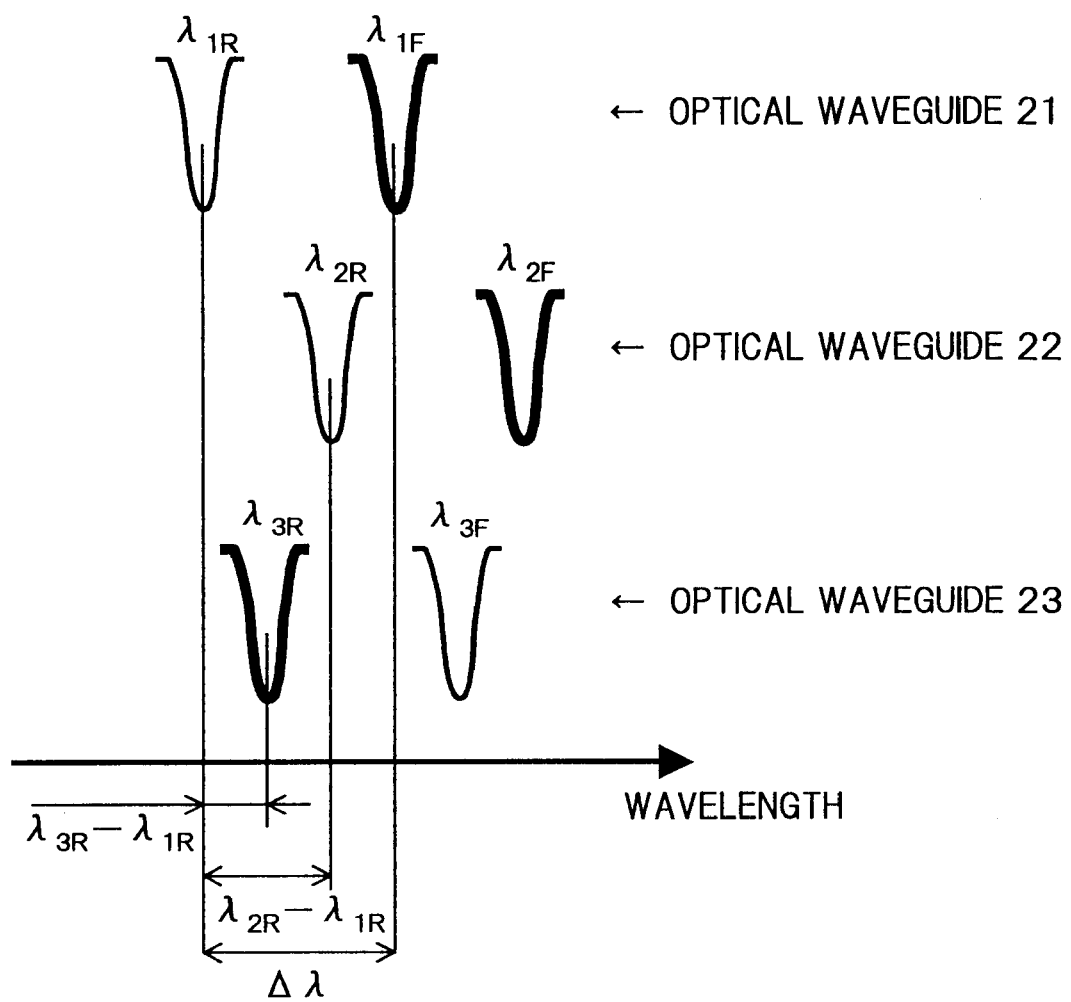
FIG. 11 is a diagram showing relationships among the selected wavelengths at respective stages set in the optical wavelength variable filter in FIG. 3.

In the constitution of FIG. 3, the setting of the blocked wavelengths (selected wavelength) corresponding to the optical waveguides 21 to 23 on the substrate 10 is indicated in the relationship as shown in FIG. 11. Therefore, for the light given to the substrate 10 via the connecting optical path $2_B$ and propagated sequentially through the optical waveguides 21, 23 and 22, the monitoring is performed on the dropped light in the optical waveguide 21 corresponding to the wavelength $\lambda_{1F}$ positioned substantially at the center of the blocking band, depending on the relationship of blocking wavelength as shown by a bold line in the figure. Moreover, for the light given to the substrate 10 via the connecting optical path $2_C$ and propagated sequentially through the optical waveguides 22, 23 and 21, the monitoring is performed on the dropped light in the optical waveguide 22 corresponding to the wavelength $\lambda_{2R}$, depending on the relationship of blocking wavelength as shown by a thin line in the figure.

Based on the peak wavelengths of dropped lights detected in the above manner, the wavelength deviation amount to the previously set control value (selected wavelength) is obtained based on the monitoring result by the second monitoring section 200, and a controlling signal for correcting the frequency of RF signal is generated according to the wavelength deviation amount, to be output to the RF signal generating circuit 40. Then, in the RF signal generating circuit 40, in accordance with the controlling signal from the RF signal controlling section 300, the frequency f of RF signal is corrected, and the corrected RF signal is applied commonly to the IDTs 41 to 43 at the respective stages.

Thus, even if the filter characteristic is changed due to a change in temperature, deterioration with time lapse or the like, it becomes possible to block reliably and stably a light desired wavelength from passing through, by tracking and controlling the frequency of RF signal.

Further, herein, at the starting time or at the alteration of setting, a process for previously detecting the control value of the AOTFs cascade loop connected on the substrate 10 is executed by the RF signal controlling section 300 based on the monitor signal M2 from the second monitoring section 200. In the second monitoring section 200, there is monitored the light passed through the monitoring AOTFs that operate in accordance with the same parameter as for the three staged AOTFs cascade connected on the substrate 10. That is, the branched light from the optical coupler 201 on the input optical path $2_{IN}$ is polarization split by the PBS 202. One of the polarization lights is given, as a TE mode light, to the PBS 231a on the optical waveguide 221 of the substrate 10 via the connecting optical path $2_G$, to be propagated within the optical waveguide 221 toward the PBS 231b. At this time, due to the acousto-optic effect of SAW generated at the IDT 241 and propagated through the SAW guide 251, only the light corresponding to the selected wavelength out of the TE mode light being propagated within the optical waveguide 221 is mode converted into a TM mode light. Then, when the respective mode lights reach the PBS 231b, the mode converted TM mode light of selective wavelength passes therethrough and is sent to the PBS 204 via the connecting optical path 21.

On the contrary, the other polarization light polarization split by the PBS 202 is rotated with polarization plane thereof by 90 degrees by the polarization rotating section 203, and then given, as a TE mode light, to the PBS 232b on the optical waveguide 222 of the substrate 10 via the connecting optical path $2_H$, to be propagated within the optical waveguide 222 toward the PBS 232a. At this time, due to the acousto-optic effect of SAW generated at the IDT 242 and propagated through the SAW guide 252, only the light corresponding to the selected wavelength out of the TE mode light being propagated within the optical waveguide 222 is mode converted into a TM light. Then, when the respective mode lights reach the PBS 232a, the mode converted TM mode light of selective wavelength passes therethrough, and is rotated with polarization plane thereof by 90 degrees by the polarization rotating section 205 and then sent to the PBS 204 via the connecting optical path $2_J$.

In the PBS 204, the polarization lights with polarization planes being orthogonal to each other from the connecting optical paths $2_I$ and $2_J$ are multiplexed to be sent to the light receiver 206. In the light receiver 206, the monitor signal from the PBS 204 is converted into an electrical signal, to be output to the RF signal controlling section 300, as the monitor signal M2.

In the RF signal controlling section 300, at the starting time or at the alteration of setting, a controlling signal for sweeping the frequency of RF signal within a required range is generated, to be output to the RF signal generating circuit 40. Then, the wavelengths of lights actually selected by the monitoring AOTFs on the substrate 10 are detected based on the monitor signal M2 from the second monitoring section 200, corresponding to the RF ark signals of respective swept frequencies, and in accordance with the detection result, the RF signal frequency corresponding to a desired selected wavelength is judged to be initially set as a control value for the starting time or the time of alteration of setting.

The control value set based on the monitor signal M2 from the second monitoring section 200, is determined in accordance with the wavelengths of lights actually passed through the monitoring AOTFs that operate in accordance with the same control parameter (frequency of RF signal) for the AOTFs cascade connected that process the main signal light, and therefore, can achieve an extremely higher precision, compared with a value obtained by using a monitoring device that operates in accordance with a different control parameter. In the optical wavelength variable filter to be used for the OXC apparatus, OADM apparatus or the like, if the light of wavelength that is needed to pass through, is erroneously blocked, the services to the users are suspended. Therefore, the control parameter requires a high precision in the initial value thereof. Accordingly, it is very useful that the controlling function of RF signal based on the monitoring result by the second monitoring section 200 is provided in the optical wavelength variable filter.

As described above, according to the control apparatus 3 of the optical wavelength variable filter 1, in order to perform the tracking control of the selected wavelengths in the respective AOTFs cascade loop connected on the substrate 10, the dropped light that has blocked from passing through at the AOTF stage corresponding to the selected wavelength most closest to the center wavelength of the blocking band, is monitored. Thus, even if the dropped light fluctuates under the influence of the dithering of RF signal, the unstable wavelength of light source or the like, the peak wavelength of the dropped light can be stably detected, so that the selected wavelengths in the AOTFs at respective stages can be controlled with high accuracy and reliability. Thereby, even if the setting of the respective AOTFs or the wavelength of input light fluctuates under the influence of a change in temperature, a change with time lapse or the like, the selected wavelengths in the AOTFs are adjusted following such a fluctuation. Thus, it is possible to realize stably a desired filter characteristic.

Note, in the above embodiment, as the respective optical filter sections of the optical wavelength variable filter 1, the use of AOTF has been described. However, the optical filter sections to be used for the optical wavelength variable filter in the present invention are not limited to AOTF. It is possible to use a known band rejection type optical filter having a variable selected wavelength.

Moreover, as one example for detecting the peak wavelength of the dropped light, the method to add the dithering to the frequency of RF signal has been described. However, the wavelength detecting method of dropped light in the present invention is not limited thereto.

What is claimed is:

1. A control method of wavelength characteristics of an optical wavelength variable filter of band rejection type including a plurality of optical filter sections each blocking a light corresponding to a selected wavelength from passing through, said optical filter sections being cascade connected to be in a multi-staged structure, wherein, when said optical wavelength variable filter has wavelength characteristics formed with a blocking band including a wavelength band according to a deviation amount obtained by deviating respective selected wavelengths from one another of said plurality of optical filter sections, a dropped light to be blocked from passing through at the optical filter section corresponding to the selected wavelength most closest to the center wavelength of said blocking band, among said respective selected wavelengths, is taken out to be monitored, and said respective selected wavelengths are adjusted based on a peak wavelength of said monitored dropped light, to control said wavelength characteristics.

2. A control method of wavelength characteristics of an optical wavelength variable filter according to claim 1, wherein, when each of said optical filter sections is an acousto-optic tunable filter that blocks the passing of light corresponding to the selected wavelength utilizing the acousto-optic effect based on a surface acoustic wave generated by applying an RF signal to an electrode, dithering is added to a frequency of the RF signal to be given to each of said acousto-optic tunable filters, the peak wavelength of said dropped light is detected based on a wavelength fluctuation corresponding to said dithering in said monitored dropped light, and the frequency of said RF signal is adjusted according to said detected peak wavelength, to control said wavelength characteristics.

3. A control apparatus of wavelength characteristics of an optical wavelength variable filter of band rejection type including a plurality of optical filter sections each blocking a light corresponding to a selected wavelength from passing through, the optical filter sections being cascade connected to be in a multi-staged structure, wherein, when said optical wavelength variable filter has wavelength characteristics formed with a blocking band including a wavelength band according to a deviation amount obtained by deviating respective selected wavelengths from one another of said plurality of optical filter sections, said control apparatus comprises: a monitoring section that takes out to monitor a dropped light to be blocked from passing through at the optical filter section corresponding to the selected wavelength most closest to the center wavelength of said blocking band, among said respective selected wavelengths; and a controlling section that adjusts said respective selected wavelengths based on a peak wavelength of the dropped light monitored by said monitoring section, to control said wavelength characteristics.

4. A control apparatus of wavelength characteristics of an optical wavelength variable filter according to claim 3, wherein, when each of said optical filter sections is an acousto-optic tunable filter that blocks the passing of light corresponding to the selected wavelength utilizing the acousto-optic effect based on a surface acoustic wave generated by applying an RF signal to an electrode, said controlling section adds dithering to a frequency of the RF signal to be given to each of said acousto-optic tunable filters, detects the peak wavelength of said dropped light based on a wavelength fluctuation corresponding to said dithering in said dropped light monitored by said monitoring section, and adjusts the frequency of said RF signal according to said detected peak wavelength, to control said wavelength characteristics.

5. A control apparatus of wavelength characteristics of an optical wavelength variable filter according to claim 3, wherein said optical wavelength variable filter includes three or more numbers of said optical filter sections.

6. A control apparatus of wavelength characteristics of an optical wavelength variable filter according to claim 3, wherein said optical wavelength variable filter has a cascade loop connection in which both ends of optical paths passing through said plurality of optical filter sections are connected to each other, and a light is input/output via said connection section.

7. A control apparatus of wavelength characteristics of an optical wavelength variable filter according to claim 6, wherein said monitoring section monitors a multiplexed light of said dropped light of the light being propagated in one direction and said dropped light of the light being propagated in the other direction, within each of said optical filter sections cascade loop connected.

\* \* \* \* \*